(12) United States Patent
Gao et al.

(10) Patent No.: US 9,357,483 B2
(45) Date of Patent: May 31, 2016

(54) METHOD AND DEVICE FOR ENERGY SAVING CONTROL IN HOME BASE STATION ENVIRONMENT

(75) Inventors: Yin Gao, Shenzhen (CN); Lifeng Han, Shenzhen (CN); Longtao Ren, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 366 days.

(21) Appl. No.: 13/813,550

(22) PCT Filed: Aug. 4, 2011

(86) PCT No.: PCT/CN2011/077992
§ 371 (c)(1),
(2), (4) Date: Jan. 31, 2013

(87) PCT Pub. No.: WO2012/019518
PCT Pub. Date: Feb. 16, 2012

(65) Prior Publication Data
US 2013/0128795 A1    May 23, 2013

(30) Foreign Application Priority Data

Aug. 9, 2010 (CN) .......................... 2010 1 0254807

(51) Int. Cl.
*H04W 4/00* (2009.01)
*H04W 52/02* (2009.01)
*H04W 88/08* (2009.01)

(52) U.S. Cl.
CPC .......... *H04W 52/0206* (2013.01); *H04W 88/08* (2013.01); *Y02B 60/50* (2013.01)

(58) Field of Classification Search
CPC ........ H04W 80/04; H04W 84/12; H04W 8/26
USPC .................. 370/328, 338, 349, 389, 392, 401
See application file for complete search history.

(56) References Cited

U.S. PATENT DOCUMENTS 6,182,231 B1 *  1/2001  Gilgen ........................ 713/324
6,363,267 B1 *  3/2002  Lindskog et al. ............. 455/574
(Continued)

FOREIGN PATENT DOCUMENTS

CN    101730169 A    6/2010
EP       2184939 A1    5/2010
WO  WO 2010/151186 A1  12/2010

OTHER PUBLICATIONS

3GPP, "3$^{rd}$ Generation Partnership Project: Technical Specification Group Radio Access Network: Evolved Universal Terrestrial Radio Access (E-UTRA) and Evolved Universal Terrestrial Radio Access Network (E-UTRAN); Overall Description; Stage 2 (Release 9)," Chapters 4, Dec. 7-8, 2009.
Sujuan, Feng et al., "Self-Organizing Networks (SON) in 3 GPP Long Term Evolution," Nomor Research GmbH, May 2008 in 15 pages.
(Continued)

*Primary Examiner* — Ricky Ngo
*Assistant Examiner* — Christine Ng
(74) *Attorney, Agent, or Firm* — Knobbe, Martens, Olson & Bear LLP (57) ABSTRACT

A method and a device for energy saving control in the home base station environment are provided to solve the problem of energy saving control in the home base station environment. In the present invention, a source base station sends an energy saving control request to a target home base station, wherein the energy saving control request comprises the information of the target base station, the information of the source base station, and the type of the energy saving control request. After receiving the energy saving control request, the target home base station performs an energy saving control processing operation, and sends a result of the energy saving control processing to the source base station through an energy saving control response. If the energy saving control processing fails, the energy saving control response further comprises a reason for the failure and/or a wait time. In the present invention, by exchanging energy saving control related messages between the source base station and the target home base station, energy saving control can be implemented on a home base station in time, and the home base station can sleep or be awakened, and thereby effective energy saving of a network in the home base station environment is achieved.

6 Claims, 3 Drawing Sheets

(56) References Cited

U.S. PATENT DOCUMENTS

| | | | |
|---|---|---|---|
| 2002/0082018 A1* | 6/2002 | Coskun et al. | 455/439 |
| 2006/0240799 A1* | 10/2006 | Kim et al. | 455/343.2 |
| 2008/0209244 A1* | 8/2008 | Miller et al. | 713/322 |
| 2009/0228695 A1* | 9/2009 | Pathak | 713/1 |
| 2009/0285143 A1 | 11/2009 | Kwun et al. | |
| 2010/0210268 A1* | 8/2010 | Lim et al. | 455/436 |
| 2010/0332677 A1* | 12/2010 | Tian | 709/233 |
| 2011/0044279 A1* | 2/2011 | Johansson et al. | 370/329 |
| 2012/0094661 A1* | 4/2012 | Frenger et al. | 455/434 |
| 2012/0224536 A1* | 9/2012 | Hahn et al. | 370/328 |

OTHER PUBLICATIONS

International Search Report mailed on Nov. 10, 2011 in PCT/CN2011/077992 in 2 pages.
3GPP TSG RAN WG3 Meeting #68, "Energy Saving for HeNBs," Montreal, Canada, May 10-14, 2010 in 4 pages.
3GPP TSG-RAN3 Meeting #67 R3-101232, "RNL-based energy saving solution," San Francisco, USA, Feb. 22-26, 2010 in 35 pages.
Supplementary European Search Report in European Application No. EP 1181 6077.9 dated Nov. 29, 2013 in 10 pages.

* cited by examiner

METHOD AND DEVICE FOR ENERGY SAVING CONTROL IN HOME BASE STATION ENVIRONMENT

CROSS-REFERENCE TO RELATED APPLICATIONS

This application is the U.S. National Phase application under 35 U.S.C. §371 of International Application PCT/CN2011/077992, filed Aug. 4, 2011, which claims priority to Chinese Application 201010254807.X, filed Aug. 9, 2010.

FIELD OF THE INVENTION

The present invention relates to the wireless cellular communication system, and in particular to a method and a device for energy saving control in the home base station environment in the Long Term Evolution (LTE) mobile communication system.

BACKGROUND OF THE INVENTION

LTE 36300-800 gives a description that the LTE network comprises an Evolved Universal Terrestrial Radio Access Network (EUTRAN) base station Evolved NodeB (eNB) and an Evolved Packet Core (EPC) and the LTE network is flat. Wherein the EUTRAN comprises a collection of eNBs connected with the EPC through the S1 interface (the inter-eNB connection is realized through the X2 interface). The S1 interface and the X2 interface are logic interfaces. One EPC can manage one or multiple eNBs, one eNB can be under the control of multiple EPCs, an eNB can manage one or multiple cells and one or multiple cells belong to a Tracking Area (TA). In the meanwhile, home base stations still exist in the LTE network. To meet the coverage demand in public places, a cell combination with one or multiple home base stations is defined as a Closed Subscriber Group (CSG).

Figure 1:
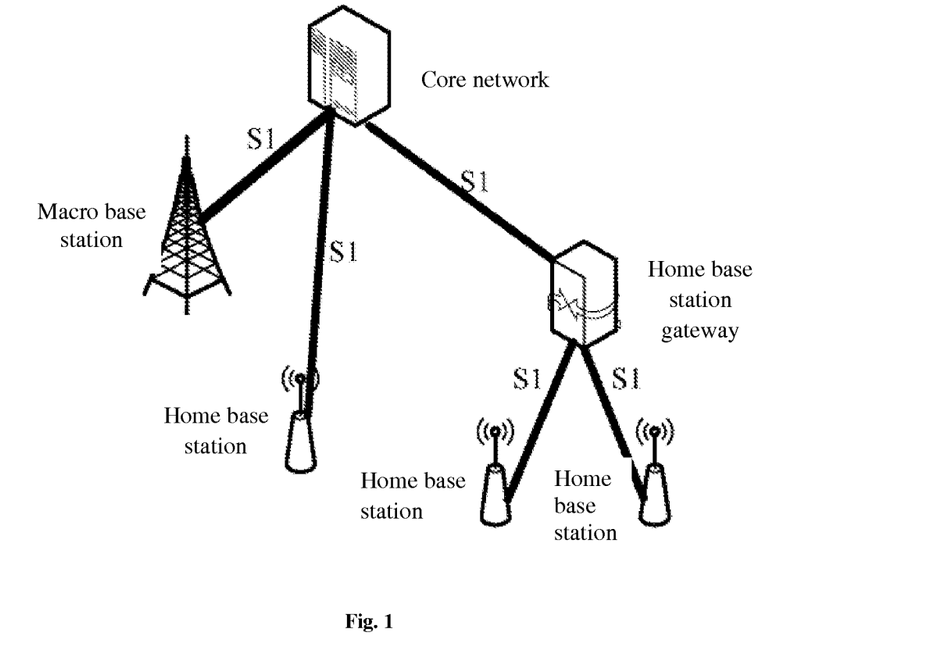
FIG. 1 is a schematic structural diagram of the network of the home base station.

Against the background that the country implements the energy saving and emission reduction policy and accelerates the building of a resource-saving society, energy saving in communications has been put on the agenda. Energy-saving and emission reduction and pushing forward "Green Action Plan" have become one of the "Five Projects of Responsibility" of China Mobile in 2008. Since the deployment of the home base station in the network is relatively free and the number of the home base stations is huge, at present, the realizable energy saving technologies comprise the carrier off time and the cell on-off technology. However, the home base station is different from the macro base station in the structure. The home base station can be connected directly with the Mobility Management Entity (MME) in the core network, and can also be connected with a gateway of the home base station. The terrestrial interface is the S1 interface, as shown in FIG. 1.

When a user equipment (UE) moves in the network, no matter it is in an idle state or in a connection state, when it approaches the Home Enhanced NodeB (HeNB) through the information in a footprint, an HeNB cell that is closed previously can be opened by reporting an air interface message. In the meanwhile, the macro base station can also require the home base station to be closed or opened through the load information.

SUMMARY OF THE INVENTION

In view of this, the present invention provides a method and a device for energy saving control in the home base station environment for solving the problem of energy saving control in the home base station environment.

The technical solution of the present invention is realized in this way:

a method for energy saving control in the home base station environment is provided, comprising:

a source base station sending an energy saving control request to a target home base station, wherein the energy saving control request comprises information of the target base station, information of the source base station and a type of the energy saving control request, wherein the type comprises SLEEP or WAKE-UP; and after receiving the energy saving control request, the target home base station performing an energy saving control processing operation, and sending a result of the energy saving control processing to the source base station through an energy saving control response, wherein the energy saving control response comprises: the information of the target base station and the information of the source base station.

Furthermore, the information of the target base station comprises: a global identifier and Tracking Area Identifier (TAI) information of the target base station; and the information of the source base station comprises: a global identifier and TAI information of the source base station.

Furthermore, the information of the target base station in the energy saving control request further comprises an Evolved Universal Terrestrial Radio Access Network (EUTRAN) Cell Global Identifier (ECGI) and/or Closed Subscriber Group Identity (CSG ID) information of one or multiple home base station cells to which the energy saving control processing operation is performed; correspondingly, the information of the target base station in the energy saving control response further comprises an ECGI and/or CSG ID information of one or multiple home base station cells having undergone successful energy saving control processing.

Furthermore, based on one of the embodiments of the present invention, the method also comprises:

the energy saving control request is based on an S1 interface and transmitted to the target home base station transparently through an Mobility Management Entity (MME) of a core network; correspondingly, the energy saving control response is also based on the S1 interface and transmitted to the source base station transparently through the MME of the core network.

Furthermore, based on one of the embodiments of the present invention, the method also comprises:

the energy saving control request is based on an S1 interface and transmitted to a gateway of the home base station transparently through an MME of a core network, and then transmitted to the target home base station transparently; correspondingly, the energy saving control response is further based on the S1 interface and transmitted to the MME of the core network transparently through the gateway of the home base station, and then transmitted to the source home base station transparently by the MME of the core network.

Furthermore, the energy saving control request and the energy saving control response are transferred through an expanded message of existing S1 interface or X2 interface messages or a newly-added and independent S1 interface or X2 interface message.

Furthermore, the energy saving control processing operation, corresponding to the type of the energy saving control request, comprises a sleep operation and a wake-up operation; When the target home base station is performing the sleep operation, an S1 interface or partial resources of the S1 interface are deleted; and if the target home base station fails in performing the energy saving control processing operation, the energy saving control response message further comprises a reason for the failure and/or a wait time field.

Based on the method of the present invention, the present invention also provides a device for energy saving control in the home base station environment, comprising:

an energy saving control request module, located at a source base station and configured to send an energy saving control request to an energy saving control processing and response module, wherein the energy saving control request comprises information of a target base station, information of the source base station and a type of the energy saving control request, and the type comprises SLEEP or WAKE-UP; and the energy saving control processing and response module, located at the target home base station and configured to perform an energy saving control processing operation and send a result of the energy saving control processing to the source base station through an energy saving control response after receiving the energy saving control request, wherein the energy saving control response comprises: the information of the target base station and the information of the source base station.

Furthermore, based on one of the embodiments of the present invention, the device also comprises:

a first transparent transmission module, located at an Mobility Management Entity (MME) and configured to transmit the energy saving control request or the energy saving control response between the energy saving control request module and the energy saving control processing and response module transparently.

Furthermore, based on one of the embodiments of the present invention, the device also comprises:

a first transparent transmission module, located at an MME and configured to transmit the energy saving control request or the energy saving control response between the energy saving control request module and a second transparent transmission module transparently; and the second transparent transmission module, located at a gateway of the home base station and configured to transmit the energy saving control request or the energy saving control response between the first transparent transmission module and the target home base station transparently.

Furthermore, the energy saving control request and the energy saving control response are transferred through an expanded message of existing S1 interface or X2 interface messages or a newly-added and independent S1 interface or X2 interface message.

Furthermore, the energy saving control processing operation, corresponding to the type of the energy saving control request, comprises a sleep operation and a wake-up operation; when the energy saving control processing and response module is performing the sleep operation, an S1 interface or partial resources of the S1 interface are deleted; and if the target home base station fails in performing the energy saving control processing operation, the energy saving control response message further comprises a reason for the failure and/or a wait time field.

In the present invention, by exchanging energy saving control related messages between the source base station and the target home base station, the energy saving control can be implemented on a home base station in time, and the home base station can sleep or be awakened, and thereby effective energy saving of the network in the home base station environment is achieved.

DETAILED DESCRIPTION OF EMBODIMENTS

To clarify the objective, technical solution and advantages of the present invention, the present invention will be further illustrated in conjunction with the embodiments and the drawings.

Embodiment 1

Figure 2:
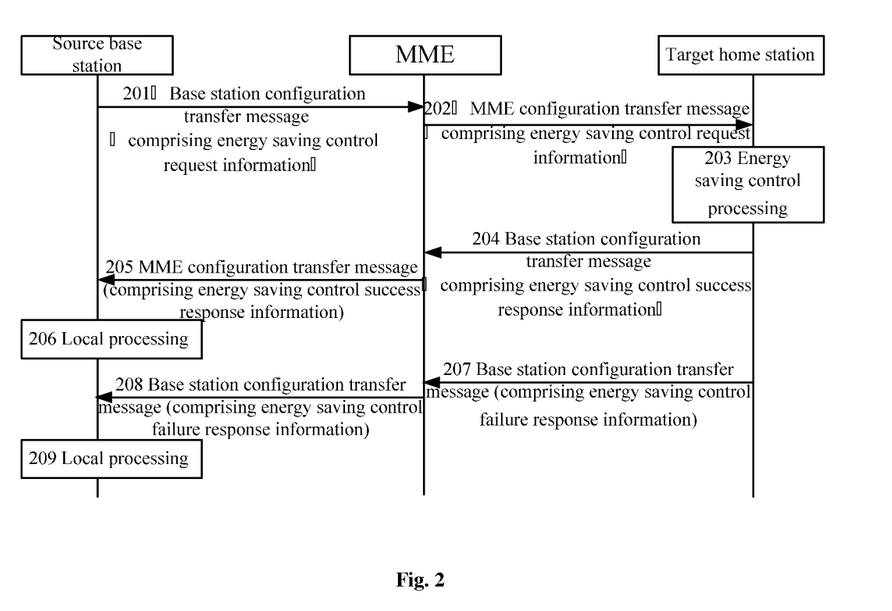
FIG. 2 is a flow chart of a method for realizing energy saving control in the home base station environment according to Embodiment 1 of the present invention.

FIG. 2 is a flow chart of a method for realizing energy saving control in the home base station environment according to Embodiment 1 of the present invention. In the embodiment, a source base station sends an energy saving control request to a target home base station, wherein the request is forwarded to the target home base station through the MME of the core network. All the energy saving control messages of the present invention are realized through the S1 interface, and the specific steps are as follows.

Step 201, the source base station sends the energy saving control request message to the MME, wherein the message carries the message type, the information of the target base station, the information of the source base station and the type of the energy saving control request.

The source base station is a macro base station or a home base station.

The message type is used for differentiating the type of the current message.

The energy saving control request can be transmitted through the expanded S1 interface base station configuration message or the newly-added signaling message.

The information of the target base station carried in the energy saving control request comprises: the global identifier and Tracking Area Identity (TAI) information of the target base station. Furthermore, the information of the target base station can also comprise ECGI and/or CSG ID information of one or multiple home base station cells with energy saving operation.

The information of the source base station carried in the energy saving control request message comprises: the ECGI and TAI information of the source base station. Furthermore, if the source base station is a home base station, the information of the source base station can also comprise the ECGI and/or CSG ID information of the home base station cell initiating the energy saving control request.

The type of the energy saving control request is a sleep type or a wake-up type.

Step 202, the MME transmits the energy saving control request message to the target home base station transparently.

The MME can transmit the energy saving control request to the target home base station transparently through the expanded MME configuration transfer message or the newly-added signaling message.

Step 203, after receiving the energy saving control request, the target home base station performs energy saving control processing according to the type of the energy saving control request. If the energy saving control processing is successful, execute Step 204; otherwise execute Step 207.

The energy saving control processing operation, corresponding to the type of the energy saving control request, comprises executing the sleep operation or executing the wake-up operation, wherein the sleep operation comprises the closing of the carrier, the closing of the cell, etc.; and the wake-up operation comprises the opening of the carrier, and the opening of the cell, etc.

Step 204, after the energy saving control processing has succeeded, the target home base station sends an energy saving control success response message to the MME, wherein the message comprises the message type, the information of the target base station and the information of the source base station.

The energy saving control success response can be sent to the MME through the expanded base station configuration transfer message or the newly-added signaling message.

The information of the target base station comprises: the global identifier and TAI information of the target base station. Furthermore, the information of the target base station can also comprise the ECGI and/or CSG ID information of the home base station cells having undergone successful energy saving operations. Correspondingly, if the energy saving control request comprises the ECGI and/or CSG ID information of one or multiple home base station cells to which the energy saving operations will be performed, the energy saving control processing success response should comprise the ECGI and/or CSG ID information of one or multiple home base station cells having undergone the successful energy saving control processing.

The information of the source base station comprises: the global identifier and TAI information of the source base station. Furthermore, the information of the source base station also comprises the ECGI and/or CSG ID information of the home base station cell initiating the energy saving control.

Step 205, the MME transmits the energy saving control success response to the source base station transparently.

The MME can transmit the energy saving control success response to the source base station transparently through the expanded MME configuration transfer message.

Step 206, the source base station carries out confirmation for the energy saving operation after receiving the energy saving control success response.

Step 207, after having failed in processing the energy saving control request, the target home base station sends an energy saving control failure response message to the MME, wherein the message comprises the message type, the information of the target base station, the information of the source base station, a reason for the failure, and/or a wait time field.

The target home base station can transmit the energy saving control failure response to the MME through the expanded base station configuration transfer message or the newly-added signaling message.

The contents of the information of the target base station and the source base station in the energy saving control failure response are the same as the contents of energy saving control success response in Step 204, so no details will be given herein.

The reason for the failure can be CSG ID error, etc.

The wait time is used for informing the source base station to initiate a new energy saving control procedure after the wait time is over;

Furthermore, the energy saving control failure response can also comprise the ECGI and/or CSG ID information of the home base station cells having undergone unsuccessful energy saving control operations. Correspondingly, if the energy saving control request comprises the ECGI and/or CSG ID information of one or multiple home base station cells for energy saving operation, the energy saving control failure response shall comprise the ECGI and/or CSG ID information of one or multiple home base station cells having undergone the unsuccessful energy saving operations.

Step 208, the MME transmits the energy saving control failure response to the source base station transparently.

The MME can transmit the energy saving control failure response to the source base station transparently through the expanded MME configuration transfer message.

Step 209, the source base station carries out confirmation for the energy saving operation after receiving the energy saving control failure response.

Embodiment 2

Figure 3:
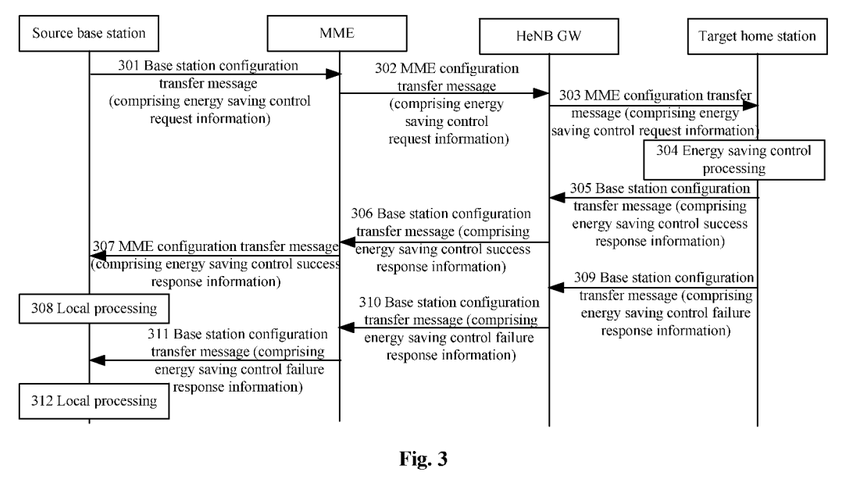
FIG. 3 is a flow chart of a method for realizing energy saving control in the home base station environment according to Embodiment 2 of the present invention.

FIG. 3 is a flow chart of a method for realizing energy saving control in the home base station environment according to Embodiment 2 of the present invention. In the embodiment, the source base station sends the energy saving control request to the target home base station, wherein the request is forwarded to a gateway of the target home base station through the MME and then forwarded to the target home base station by the gateway of the target home base station. The energy saving control messages in the embodiment are realized through the S1 interface, and the specific steps are as follows.

Step 301, the source base station sends the energy saving control request message to the MME, and the message carries the message type, the information of the target base station, the information of the source base station and the type of the energy saving control request.

The source base station is a macro base station or a home base station.

The message type, equivalent to the identification information of the message type, is used for differentiating the current message.

The energy saving control request can be transmitted through the expanded S1 interface base station configuration message or the newly-added signaling message.

The information of the target base station carried in the energy saving control request comprises: the global identifier and TAI information of the target base station. Furthermore, the information of the target base station can also comprise the ECGI and/or CSG ID information of one or multiple home base station cells to which energy saving operations will be performed The information of the source base station carried in the energy saving control request comprises: the global identifier and TAI information of the source base station. Furthermore, if the source base station is a home base station, the information of the source base station can also comprise the ECGI and/or CSG ID information of the home base station cell initiating the energy saving control request.

The type of the energy saving control request is the sleep type or the wake-up type.

Step 302, the MME transmits the energy saving control request to the gateway of the home base station transparently.

Step 303, the gateway of the home base station transmits the energy saving control request to the target home base station transparently.

In Step 302 and Step 303, the MME and the gateway of the home base station can transmit the energy saving control request transparently through the expanded MME configuration transfer message or the newly-added signaling message.

Step 304, after receiving the energy saving control request, the target home base station performs the energy saving control processing according to the type of the energy saving control request. If the energy saving control processing is successful, execute Step 305; otherwise execute Step 309.

The energy saving control processing operation, corresponding to the type of the energy saving control request, comprises executing the sleep operation or the wake-up operation, wherein the sleep operation comprises the closing of the carrier and the closing of the cell, etc.; and the wake-up operation comprises the opening of the carrier and the opening of the cell, etc.

Step 305, after the energy saving control processing has succeeded, the target home base station sends the energy saving control success response message to the gateway of the home base station, wherein the message comprises the message type, the information of the target base station and the information of the source base station.

The information of the target base station comprises: the global identifier and TAI information of the target base station. Furthermore, the information of the target base station also comprises the ECGI and/or CSG ID information of one or multiple home base station cells having undergone successful energy saving operations.

The information of the source base station comprises: the global identifier and TAI information of the source base station. Furthermore, the information of the source base station also comprises the ECGI and/or CSG ID information of the home base station cell initiating energy saving control.

Step 306, the gateway of the home base station sends the energy saving control success response to the MME.

In Step 305 and Step 306, the target home base station and the gateway of the home base station can transmit the energy saving control success response transparently through the expanded MME configuration transfer message or the newly-added signaling message.

Step 307, the MME transmits the energy saving control success response to the source base station transparently.

The MME can transmit the energy saving control success response transparently through the expanded MME configuration transfer message or the newly-added signaling message.

Step 308, the source base station carries out confirmation for the energy saving operation after receiving the energy saving control success response.

Step 309, after having failed in processing the energy saving control request, the target home base station sends the energy saving control failure response message to the gateway of the home base station, wherein the message comprises the message type, the information of the target base station, the information of the source base station, a reason for the failure, and/or a wait time field.

The contents of the information of the target base station and the source base station in the energy saving control failure response are the same as energy saving control success response in Step 305, so no details will be given herein.

The reason for the failure can be CSG ID error, etc,.

The wait time is used for informing the source base station to initiate a new energy saving control procedure after the wait time is over;

Furthermore, the energy saving control failure response can also comprise the ECGI and/or CSG ID information of the home base station cell having undergone unsuccessful energy saving control operations. Correspondingly, if the energy saving control request comprises the ECGI and/or CSG ID information of one or multiple home base station cells for energy saving operation, the energy saving control failure response shall comprise the ECGI and/or CSG ID information of one or multiple home base station cells having undergone the unsuccessful energy saving operations.

Step 310, the gateway of the home base station transmits the energy saving control failure response to the MME transparently.

In Step 309 and Step 310, the target home base station and the gateway of the home base station can transmit the energy saving control failure response transparently through the expanded MME configuration transfer message or the newly-added signaling message.

Step 311, the MME transmits the energy saving control failure response to the source base station transparently.

The MME can transmit the energy saving control failure response transparently through the expanded MME configuration transfer message or the newly-added signaling message.

Step 312, the source base station carries out confirmation for the energy saving operation after receiving the energy saving control failure response message.

Optionally, if there is an X2 interface between home base stations or between the gateways of home base stations, the energy saving control request or the energy saving control response message can also be directly transferred between the source base station and the target home base station through the X2 interface. The contents contained in the messages are the same as those in the embodiments above, so no details will be given herein.

Embodiment 3

Figure 4:
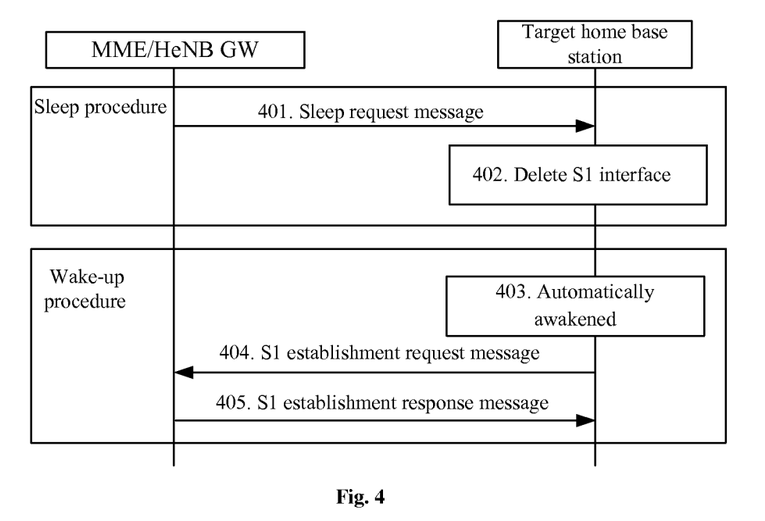
FIG. 4 is a flow chart of a method for realizing energy saving control in the home base station environment according to Embodiment 3 of the present invention.

FIG. 4 is a flow chart of a method for realizing energy saving control in the home base station environment according to Embodiment 3 of the present invention. The embodiment is for the scene that the S1 interface is deleted when the target home base station receives a sleep request, and the specific steps are as follows.

Sleep procedure:

Step 401, when the MME or the gateway of the home base station needs to inform the home base station to enter into the sleep state, the MME or the gateway of the home base station sends the sleep request to the target home base station.

The sleep request is sent to the target home base station to be awakened through the RESET message of the S1 interface or the newly-added S1 interface signaling, wherein the sleep request comprises the sleep instruction information.

Step 402, the target base station performs a sleep operation after receiving the sleep request. If the sleep operation is successful, the home base station deletes the S1 interface.

Wake-up procedure:

Step 403, when the target home base station having entered into the sleep state needs to be awakened, it will be automatically awakened; and the automatic arousal can be timed or be done when a wake-up cycle arrives.

Step 404, if the target home base station has been automatically awakened, the target home base station sends an S1 establishment request message to MME/HeNB GW.

Step 405, after receiving the S1 establishment request message, the MME/HeNB GW performs an S1 interface establishment operation. If the establishment of the S1 interface is successful, an establishment response message is replied; otherwise an S1 establishment failure message is sent.

Embodiment 4

Figure 5:
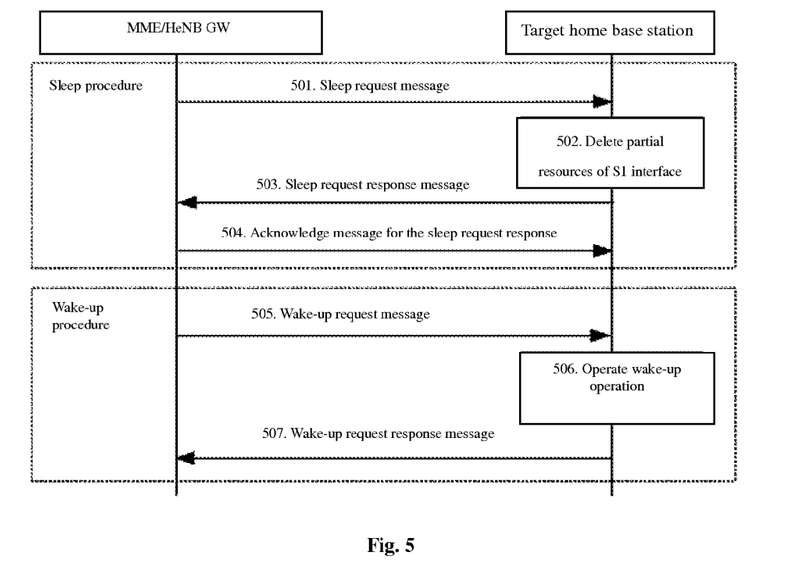
FIG. 5 is a flow chart of a method for realizing energy saving control in the home base station environment according to Embodiment 4 of the present invention.

FIG. 5 is a flow chart of a method for realizing energy saving control in the home base station environment according to Embodiment 4 of the present invention. The embodiment is for the scene that partial resources of the S1 interface are deleted when the target home base station receives a sleep request, and the specific steps are as follows.

Step 501, when the MME/HeNB GW needs to inform the home base station to enter into the sleep state, the sleep request message is sent to the target home base station.

The sleep request is sent to the target home base station to be awakened through the RESET message of the S1 interface or the newly-added signaling, wherein the sleep request comprises the sleep instruction information.

Step 502, after receiving the sleep request message, the target home base station performs a sleep operation. If the sleep operation is successful, namely falling-asleep is successful, the base station succeeds in entering into the sleep state and partial resources of the S1 interface are deleted. The partial resources refer to the special resources related to a UE, used to reduce the consumption of unnecessary memory resources.

Step 503, the target home base station sends a sleep request response message to the MME/HeNB GW.

The sleep request response can be sent to the target home base station through the RESET message of the S1 interface.

The sleep request response message carries an indication of whether the sleep operation is successful. If the sleep operation fails, the sleep request response message can also carry a reason for the sleep failure and other information.

Step 504, after receiving the sleep request response message, the MME/HeNB GW clears the special resources on the S1 interface and sends the acknowledge message for the sleep request response to the target home base station.

The acknowledge message for the sleep request response can be sent to the target home base station through the RESET acknowledge message of the S1 interface.

Wake-up procedure:

Step 505, when the target home base station having entered into the sleep state needs to be awakened, the MME/HeNB GW sends a wake-up request message to the target home base station to be awakened.

The wake-up request message can be sent through the current message of the expanded S1 interface or the newly-added interface signaling.

Step 506, the target home base station performs a wake-up operation after receiving the wake-up request message.

Step 507, the target home base station sends a waking-up request response message to the MME/HeNB GW;

The wake-up request response message comprises the indication of whether the wake-up operation is successful. If the wake-up operation fails, the wake-up request response message also comprises a reason for the failure.

Embodiment 5

Figure 6:
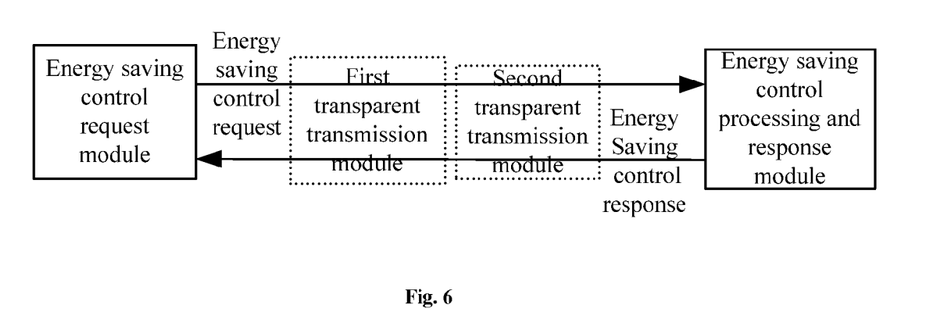
FIG. 6 is a schematic structural diagram of a device for energy saving control in the home base station environment according to Embodiment 5 of the present invention.

FIG. 6 is a schematic structural diagram of a device for energy saving control in the home base station environment according to Embodiment 5 of the present invention. The device comprises: an energy saving control request module, and an energy saving control processing and response module. Optionally, the device further comprises a first transparent transmission module and a second transparent transmission module.

The energy saving control request module is located at the source base station and configured to send energy saving control requests to the energy saving control processing and response module, wherein the energy control request comprises the information of the target base station, the information of the source base station and the type of the energy saving control request. The type of the energy saving control request comprises the sleep type or the wake-up type. The information of the target base station comprises the global identifier and TAI information of the target base station; and the information of the source base station comprises the global identifier and TAI information of the source base station.

The information of the target base station in the energy saving control request also comprises the ECGI and/or CSG ID information of one or multiple home base station cells to which the energy saving operations will be performed. Correspondingly, the information of the target base station in the energy saving control response also comprises the ECGI and/or CSG ID information of one or multiple home base station cells having undergone the successful energy saving processing.

The energy saving control processing and response module is located at the target home base station and configured to perform the energy saving control processing operation and send a result of the energy saving control processing to the source base station through an energy saving control response after receiving the energy saving control request. The energy saving control response comprises: the information of the target base station and the information of the source base station.

The present invention can be realized based on the S1 interface or the X2 interface. The energy saving control request and energy saving control response shall be transferred through the expanded message of the existing S1 or X2 interface messages or a newly-added and independent S1 interface or X2 interface message.

If the target home base station is directly connected with the MME of the core network, the energy saving control request and energy saving control response shall be transmitted in two directions transparently through the first transparent transmission module of the MME. If the gateway of the home base station is connected between the target home base station and the MME of the core network, the energy saving control request and energy saving control response shall be transmitted in two directions transparently through the first transparent transmission module located at the MME and the second transparent transmission module located at the gateway of the home base station.

The energy saving control processing operation, corresponding to the type of the energy saving control request, comprises the sleep operation and the wake-up operation. The S1 interface or partial resources of the S1 interface can be deleted when the energy saving control processing and response module performs the sleep operation. If the target home base station fails in performing the energy saving control processing operation, the energy saving control response message also comprises a reason for the failure and/or a wait time field.

The description above is just the preferred embodiments of the present invention, and is not intended to limit the protection scope of the present invention.

INDUSTRIAL APPLICABILITY

A method and a device for energy saving control in the home base station environment are provided to solve the problem of energy saving control in the home base station environment. In the present invention, by exchanging energy saving control related messages between the source base station and the target home base station, energy saving control can be implemented on a home base station in time, and the home base station can sleep or be awakened, and thereby effective energy saving of the network in the home base station environment is achieved.

What is claimed is:

1. A method for energy saving control in the home base station environment, comprising:

a source base station sending an energy saving control request to a target home base station, wherein the energy saving control request comprises information of the target base station, information of the source base station and a type of the energy saving control request, wherein the type comprises SLEEP or WAKE-UP, wherein the energy saving control request is used for indicating to the target home base station to perform energy saving control processing according to the type of the energy saving control request; and after receiving the energy saving control request, the target home base station performing an energy saving control processing operation, and sending a result of the energy saving control processing to the source base station through an energy saving control response, wherein the energy saving control response comprises the information of the target base station and the information of the source base station, wherein the information of the target base station comprises a global identifier and Tracking Area Identifier (TAI) information of the target base station, wherein the information of the source base station comprises a global identifier and TAI information of the source base station, wherein the information of the target base station in the energy saving control request further comprises an Evolved Universal Terrestrial Radio Access Network (EUTRAN) Cell Global Identifier (ECGI) and/or Closed Subscriber Group Identity (CSG ID) information of one or multiple home base station cells to which the energy saving control processing operation is performed, wherein, correspondingly, the information of the target base station in the energy saving control response further comprises an ECGI and/or CSG ID information of one or multiple home base station cells having undergone successful energy saving control processing, and wherein:

the energy saving control request is based on an S1 interface and is transmitted to the target home base station transparently through a Mobility Management Entity (MME) of a core network and, correspondingly, the energy saving control response is also based on the S1 interface and is transmitted to the source base station transparently through the MME of the core network, or the energy saving control request is based on the S1 interface and is transmitted to a gateway of the home base station transparently through the MME of a core network, and then transmitted to the target home base station transparently and, correspondingly, the energy saving control response is further based on the S1 interface and is transmitted to the MME of the core network transparently through the gateway of the home base station, and then transmitted to the source home base station transparently by the MME of the core network.

2. The method according to claim 1, wherein the energy saving control request and the energy saving control response are transferred through an expanded message of existing S1 interface or X2 interface messages or a newly-added and independent S1 interface or X2 interface message.

3. The method according to claim 1, wherein the energy saving control processing operation, corresponding to the type of the energy saving control request, comprises a sleep operation and a wake-up operation and wherein the method further comprises:

when the target home base station is performing the sleep operation, deleting the S1 interface or partial resources of the S1 interface; and if the target home base station fails in performing the energy saving control processing operation, including a reason for the failure and/or a wait time field in the energy saving control response.

4. A device for energy saving control in the home base station environment, comprising:

an energy saving control request module comprising one or more processors, the energy saving control request module located at a source base station and configured to send an energy saving control request to an energy saving control processing and response module, wherein the energy saving control request comprises information of a target base station, information of the source base station and a type of the energy saving control request, and the type comprises SLEEP or WAKE-UP, wherein the energy saving control request is used for indicating to the target home base station to perform energy saving control processing according to the type of the energy saving control request;

the energy saving control processing and response module comprising one or more processors, the energy saving control processing and response module located at the target home base station, the energy saving control processing and response module connected to the energy saving control request module and configured to perform an energy saving control processing operation and send a result of the energy saving control processing to the source base station through an energy saving control response after receiving the energy saving control request, wherein the energy saving control response comprises the information of the target base station and the information of the source base station; and a first transparent transmission module, located at a Mobility Management Entity (MME) and connected to the energy saving control request module, the first transparent transmission module configured to:

transmit the energy saving control request or the energy saving control response between the energy saving control request module and the energy saving control processing and response module transparently, or transmit the energy saving control request or the energy saving control response between the energy saving control request module and a second transparent transmission module transparently, the second transparent transmission module located at a gateway of the home base station, connected to the first transparent transmission module, and configured to transmit the energy saving control request or the energy saving control response between the first transparent transmission module and the target home base station transparently, wherein the information of the target base station comprises: a global identifier and Tracking Area Identifier (TAI) information of the target base station, wherein the information of the source base station comprises: a global identifier and TAI information of the source base station, wherein the information of the target base station in the energy saving control request further comprises an Evolved Universal Terrestrial Radio Access Network (EUTRAN) Cell Global Identifier (ECGI) and/or Closed Subscriber Group Identity (CSG ID) information of one or multiple home base station cells to which the energy saving control processing operation is performed, and wherein correspondingly, the information of the target base station in the energy saving control response further comprises an ECGI and/or CSG ID information of one or multiple home base station cells having undergone successful energy saving control processing.

5. The device according to claim 4, wherein the energy saving control request and the energy saving control response are transferred through an expanded message of existing S1 interface or X2 interface messages or a newly-added and independent S1 interface or X2 interface message.

6. The device according to claim 4, wherein the energy saving control processing operation, corresponding to the type of the energy saving control request, comprises a sleep operation and a wake-up operation, and wherein:

when the energy saving control processing and response module is performing the sleep operation, the energy saving control processing and response module is further configured to delete an S1 interface or partial resources of the S1 interface; and if the target home base station fails in performing the energy saving control processing operation, the energy saving control processing and response module is further configured to include a reason for the failure and/or a wait time field in the energy saving control response.

* * * * *